United States Patent [19]

Domigan

[11] Patent Number: 4,536,612

[45] Date of Patent: Aug. 20, 1985

[54] BOX FOR RAISED FLOORS

[75] Inventor: Charles N. Domigan, Coolville, Ohio

[73] Assignee: Butler Manufacturing Company, Kansas City, Mo.

[21] Appl. No.: 500,620

[22] Filed: Jun. 3, 1983

[51] Int. Cl.³ .............................................. H02G 3/08
[52] U.S. Cl. ......................................... 174/48; 52/221
[58] Field of Search ............... 174/48, 49, 53; 52/221; 220/3.2, 3.3, 3.4, 3.5

[56] References Cited

U.S. PATENT DOCUMENTS 3,420,018  1/1969  Fork ................................... 174/49 X
3,701,837  10/1972 Fork ................................... 174/49 X Primary Examiner—A. T. Grimley
Assistant Examiner—D. A. Tone
Attorney, Agent, or Firm—Frederick J. Olsson

[57] ABSTRACT

Box has a hollow main housing and means which separates the housing into two power sections and an electrically isolated communication section between the power sections. Each power section has a receptacle. An opening above the communication section provides access to the communication section and to the receptacle plug-in heads. The housing mounts wire connectors for each power section for receiving the head of a cable set. A passageway under the communication section allows power conductors to connect the receptables in the power sections.

8 Claims, 2 Drawing Figures

BOX FOR RAISED FLOORS

The invention relates in general to electrical distribution systems for buildings and in particular to such systems for use beneath a building floor commonly referred to as raised floor, access floor, false floor, computer floor, and the like.

More specifically the invention relates to a box to be connected to the underside of a raised floor panel and to the electrical system below the floor to provide power and communication service at a work station on the floor.

One of the principal objectives of the invention is to improve the useful art of electrical distribution systems for raised floors by providing an improved floor box: which provides for the use of flexible wiring systems with raised floors; which can provide for power, telephone, and data services at one location or any combination of same; which permits through power; which can be raised out with its floor panel and quickly disconnected from the distribution system; and which can be fabricated from stamped parts and, thus, contribute to low cost.

Figure 1:
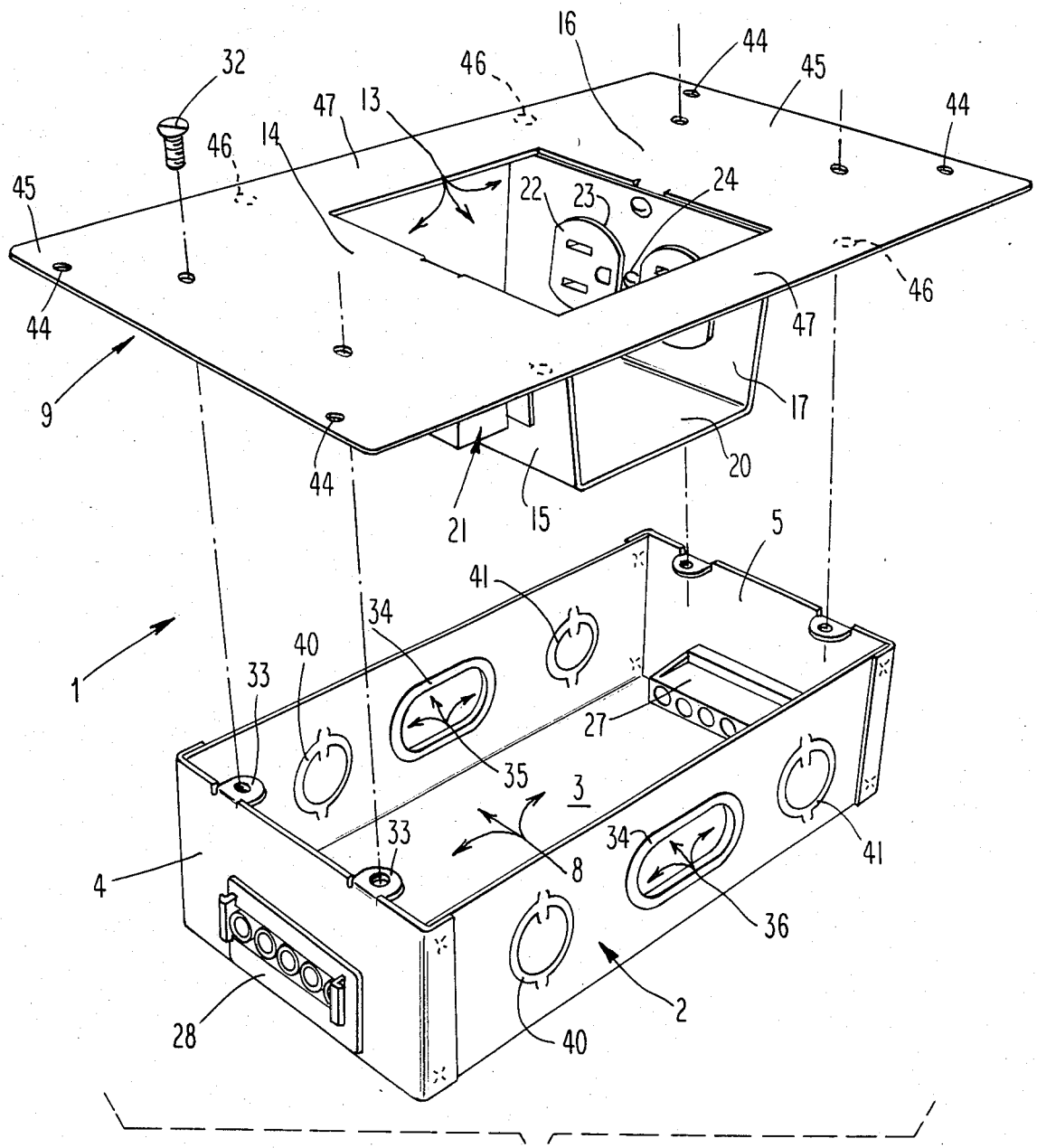
Figure 2:
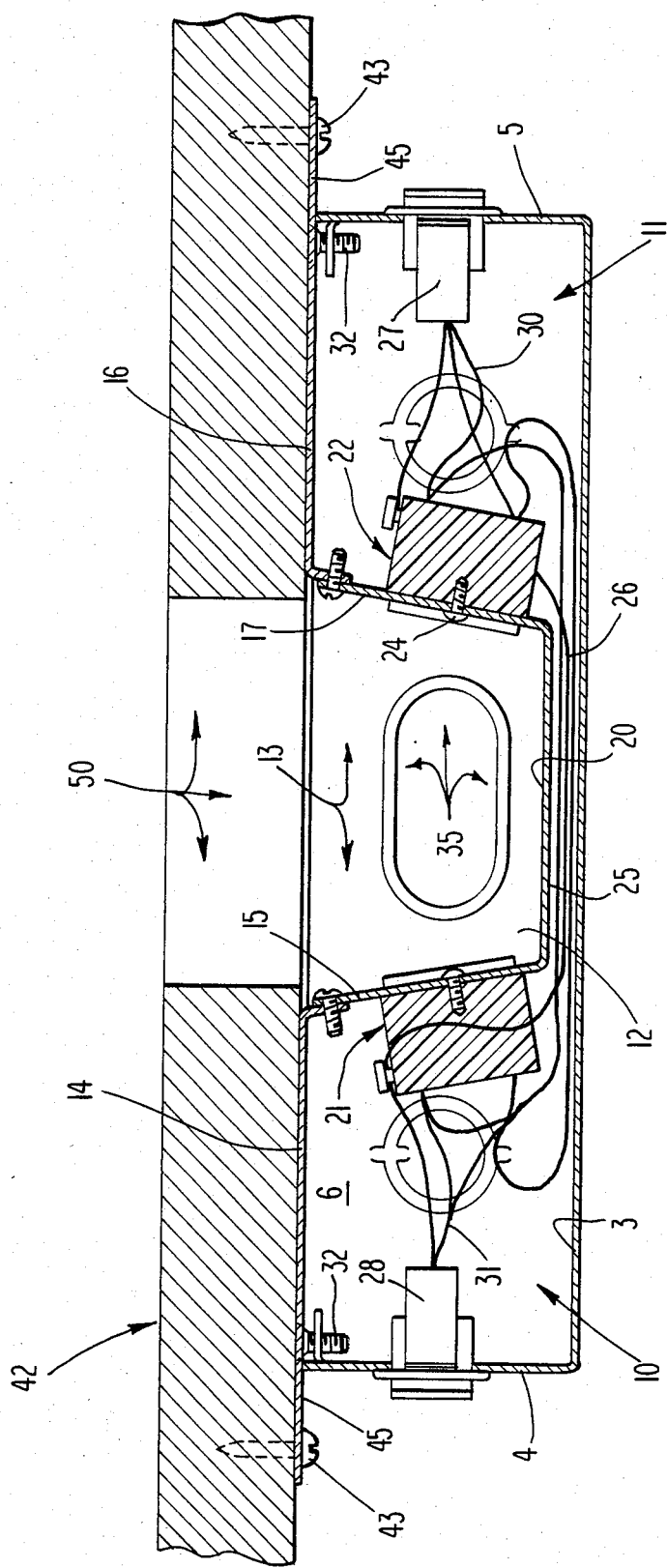

The invention will be described below in connection with the following drawings wherein:

FIG. 1 is an exploded view of a floor box constructed in accordance with the invention; and FIG. 2 is a sectional elevational view of the box of FIG. 1 installed under a typical floor panel.

In FIG. 1 the box 1 has a main housing 2 which includes a bottom wall 3, first and second (short) side walls 4 and 5, and third and fourth (long) side walls 6 and 7 extending upwardly from the bottom. The walls are joined together at the corners of the box as noted. The top edges of the side walls form an opening 8.

The housing receives divider means 9 and the divider, in conjunction with the bottom and side walls, divides the inside of the housing (FIG. 2) into first and second power sections 10 and 11 and a communication section 12 between the power sections. The divider has access opening 13.

The divider is comprised of the following: a first power section top 14 spans the opening 8 and abuts the first, third, and fourth side walls 4, 6, and 7 and forms part of the access opening 13. A receptacle bracket 15 is connected to the first power section top 14 at the opening 13 and abuts the third and fourth side walls and extends downwardly therefrom. The lower end of the bracket 15 is spaced above the bottom 3. A second power section top 16 spans said opening 8 and abuts the second, third, and fourth side walls 5, 6, and 7 and forms part of the access opening 13. A second receptacle bracket 17 is connected to the second power section top 16 at the opening 13 and abuts said third and fourth side walls and extends downwardly therefrom. The lower end of the bracket 17 is spaced above the bottom 3. A bridge 20 is connected to the lower ends of said first and second receptacle brackets and abuts the third and fourth side walls and extends over and above the bottom 3.

The brackets 15 and 17 each have means comprising mounting holes and attaching screws to support the receptacles 21 and 22. For example, for the receptacle 22 the bracket 17 has holes 23 and attaching screw 24.

From the foregoing, the formation of the power and communication sections will be evident. The power section 10 is formed by the bottom 3, the first, second, and third side walls 4, 6, and 7, the first top 14 and first receptacle bracket 15. The power section 11 is formed by the bottom 3, the second, third, and fourth side walls 5, 6, and 7 the second top 16 and second receptacle bracket 17. The communication section 17 is formed by the bridge 20 and the first and second receptacle sections 15 and 17.

The space between the bottom 3 at the bridge 20 and the side walls 6 and 7 provides a passageway 25 for conductors 26 interconnecting the receptacle means 21 and 22.

The side walls 4 and 5 of the power sections each are provided with apertures to mount the wire connectors 27 and 28. Conductors 30 and 31 connect the respective wire connectors 27 and 28 and the receptacles 21 and 22.

The wire connectors 27 and 28 are of the kind shown in copending application of Richard D. Benscoter, et al Ser. No. 480,470 filed March 30, 1983 and entitled COMPONENTS FOR FLEXIBLE WIRING SYSTEMS and assigned to the assignee of this invention.

The divider 9 is joined to the housing 2 as by self-tapping screws 32 in the apertured tabs 33.

The side walls 6 and 7 are made with knockouts in the communication section area 12 so that one or both may be removed to provide passage for communication cable. Thus, in the housing 2 both knockouts in walls 6 and 7 have been removed and the holes provided with grommets 34 forming the passages 35 and 36. These passages both may receive telephone or data cable or one data and the other telephone.

In addition to the wire connectors 27 and 28, the power sections 10 and 11 have knockouts 40 and 41 in the event it is desired to hard wire the box to conduit in the field.

The floor panel 42 illustrated therein is comprised of wood or other composition and the box 1 may be secured to the panel as by screws 43 extending through clearance holes 44 in the flanges 45 of the tops 14 and 16, or by screws extending through clearance holes 46 in flanges 47. As seen in FIG. 2, the floor panel 42 has an access hole 50 aligned with the opening 13. Normally, a flush floor fitting or an abandon plate will be employed on the access hole 50.

It will be understood that various other conventional means can be used to secure the box to the underside of a panel. Such means, of course, depends on the material and structure of the panel. In some cases, the flanges 45 and 47 can be eliminated.

In any event, the sheet metal, minimum material structure secured to the bottom of the panel and joined to the electrical distribution system via quick disconnects (wire connector and amphenols) is advantageous in providing for the box to be pulled out with a panel and readily disengaged from the electrical system.

In the embodiment shown, the main housing 2 is formed by stamping out a sheet metal blank, folding into shape, and joining the corners as by spot welding. The divider 9 is comprised of two stamped and formed pieces. First the top plate which includes the opening 13 and power section top 14 and 16 and may include one or both of the flanges 45 and 47. The second piece is a saddle which includes the receptacle brackets 15 and 17 together with the bridge 20.

The openings 13 and 50 and the communication section 12 provide ample clearance for bringing out the communications cable from one or both of the passageways 35 to a floor fitting. The communication section has ample space for storing and connecting or disconnecting an amphenol connector. Furthermore, the openings 13 and 40 and section 12 provide sufficient room for accessing one or both of the receptacles with plugs from floor appliances.

Lastly, it is pointed out that the power-thru feature, say power-in via wire connector 27 and power-out via wire connector 28, is provided by the clearance in the power sections 10 and 11 and in particular by the provision of the passageway 25. Also, it is to be noted that with respect to each of the receptacles 21 and 22 the portion where the conductors are connected is within the confines of the power section while the plug-in portion or plug-in in head is in the communication section.

I claim:

1. A box for mounting on the underside of a raised floor panel, the box comprising:

a main housing comprising a bottom wall, first and second opposite side walls extending upwardly from the bottom wall, and third and fourth side walls extending upwardly from the bottom wall, the top edges of the side walls forming an opening;

divider means in said housing for dividing the housing into a pair of spaced apart first and second power sections and a communications section therebetween;

the divider means including a first power section top adjacent said opening and abutting said first, third, and fourth side walls, a first receptacle bracket connected to said first power section top and abutting said third and fourth side walls, and extending downwardly toward said bottom wall with the lower end spaced from said bottom wall, a second power section top adjacent said opening and abutting said second, third and fourth side walls, a second receptacle bracket connected to said second power section top and abutting said third and fourth side walls, and extending downwardly toward said bottom wall with the lower end being spaced from said bottom wall, and a bridge connected to the lower ends of said first and second receptacle brackets and abutting said third and fourth side walls and spaced above and extending over said bottom wall;

said first and second power section tops, at least in part, forming an access opening providing access to said communication section;

for each said receptacle bracket, means for supporting a receptacle;

for at least one of said third and fourth side walls, communication knockout means therein spaced above said bridge;

said first power section being formed by said bottom wall, said first, third, and fourth side walls, said first power section top, and said first receptacle bracket;

said second power section being formed by said bottom wall, said second, third, and fourth side walls, said second power section top and said second receptacle bracket;

said communication section being formed by said bridge, said third and fourth walls, and said first and second receptacle brackets;

said bridge, said bottom wall, and said second and third side walls forming a closed passageway for power conductors extending between said first and second power sections; and means for securing the box to the underside of a raised floor panel.

2. The box of claim 1 which is pre-wired by that it further includes:

receptacle means respectively mounted in said first and second receptacle brackets;

conductors electrically connecting the receptacle means and extending through said passageway;

a pair of wire connectors respectively mounted on said first and second walls; and conductor means respectively electrically connecting said receptacles and said wire connectors.

3. A box for mounting on the underside of a raised floor panel, the box comprising:

a main housing comprising a bottom wall, first and second opposite side walls extending upwardly from the bottom wall, and third and fourth side walls extending upwardly from the bottom wall, the top edges of the side walls forming an opening;

a rectangular shaped cover mounted on the top edges of said side walls;

an access opening formed in the central portion of said cover, the opening having first and second opposite edges parallel said first and second side walls;

a saddle inside of said housing, the saddle comprising a first receptacle bracket connected to said cover adjacent said first edge and abutting said third and fourth side walls and extending downwardly toward said bottom wall with the lower end spaced from said bottom wall, a second receptacle bracket connected to said cover adjacent said second edge and abutting said third and fourth side walls, and extending downwardly therefrom toward said bottom wall with the lower end spaced from said bottom wall, and a bridge connected to the lower ends of said first and second receptacle brackets and abutting said third and fourth side walls and spaced above and extending over said bottom wall;

for each receptacle bracket, means for supporting a receptacle;

for at least one of said third and fourth side walls, communication knockout means therein spaced above said bridge;

said first power section being formed by said bottom wall, said first, third, and fourth side walls, said cover and said first receptacle bracket;

said second power section being formed by said bottom wall, said second third, and fourth side walls, said cover and said second receptacle bracket;

said communication section being formed by said bridge, said third, and fourth side walls and said first and second receptacle brackets;

said bridge, said bottom wall, and said second and third side walls forming a closed passageway for power conductors extending between said first and second power sections; and means for securing the box to the underside of a raised floor panel.

4. The box of claim 3 which is pre-wired by that it further includes:

receptacle means respectively mounted in said first and second receptacle brackets;

conductors electrically connecting the receptacle means and extending through said passageway;

a pair of wire connectors respectively mounted on said first and second walls; and conductor means respectively electrically connecting said receptacles and said wire connectors.

5. The box of claim 3 wherein said saddle is connected to said cover by a pair of apertured tabs respectively formed on said first and second edges and extending downwardly therefrom and self-tapping screw means respectively extending through the receptacle bracket into the aperture of said tabs.

6. A floor box comprising:
 a hollow housing having a top opening; and
 divider means connected with said housing and forming, in conjunction with the housing, a pair of spaced apart power sections with each section having a receptacle bracket, a communication section partially formed by said receptacle brackets and being open to said top opening, and a passageway underneath the communication section and providing space for conductors to extend between the power sections.

7. The box of claim 6 which is pre-wired by that it further includes:
 receptacle means respectively mounted on said receptacle brackets;
 conductors electrically connecting the receptacle means and extending through said passageway;
 a pair of wire connectors mounted on said housing respectively in said power sections; and
 conductor means respectively electrically connecting said receptacle means and said wire connectors.

8. A floor box comprising:
 a hollow housing having a top opening; and
 divider means connected with said housing and forming, in conjunction with the housing, a pair of spaced apart power sections respectively adjacent opposite ends of the housing with each section having a receptacle bracket, a communication section intermediate the power sections partially formed by said receptacle brackets and being open to said top opening, and a passageway underneath the communication section and providing space for conductors to extend between the power sections.

* * * * *